United States Patent
Mellot

(10) Patent No.: US 8,817,108 B2
(45) Date of Patent: Aug. 26, 2014

(54) METHOD OF REAL-TIME CHECKING OF A MATRIX IMAGING DEVICE, AND ASSOCIATED DEVICE

(75) Inventor: Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 97 days.

(21) Appl. No.: 13/560,077

(22) Filed: Jul. 27, 2012

(65) Prior Publication Data

US 2013/0027563 A1 Jan. 31, 2013

(30) Foreign Application Priority Data

Jul. 29, 2011 (FR) ...................................... 11 56963

(51) Int. Cl.
*H04N 17/00* (2006.01)
*H04N 17/02* (2006.01)

(52) U.S. Cl.
USPC ........... 348/180; 348/181; 348/184; 348/185; 348/187; 348/64; 348/137; 348/191; 348/211.8; 348/211.13; 348/307; 348/308; 348/309; 348/333.01; 348/333.02; 348/352; 348/571; 348/590; 348/598; 348/659; 348/680; 348/693; 348/725; 348/730; 348/737; 348/409.1; 348/455; 348/456; 348/490; 348/491; 348/129; 348/134; 348/192; 348/231.3; 348/714; 348/715

(58) Field of Classification Search
USPC ......... 348/180, 184, 307, 308, 309, 352, 571, 348/572, 659, 680, 693, 725, 730, 737, 181, 348/185, 187, 64, 137, 129, 134, 191, 192, 348/211.8, 211.13, 231.3, 333.01, 333.02, 348/590, 598, 714, 715, 409.1, 455, 456, 348/490, 491

See application file for complete search history.

(56) References Cited

U.S. PATENT DOCUMENTS

| | | | | |
|---|---|---|---|---|
| 4,676,212 A * | 6/1987 | Kashimura et al. | ...... | 123/406.29 |
| 5,182,623 A * | 1/1993 | Hynecek | ......... | 257/230 |
| 5,301,355 A * | 4/1994 | Koinuma et al. | ............... | 455/21 |
| 5,528,643 A * | 6/1996 | Hynecek | ......... | 377/60 |
| 6,943,837 B1 * | 9/2005 | Booth, Jr. | ...................... | 348/297 |
| 7,223,954 B2 * | 5/2007 | McNulty | .................... | 250/208.1 |
| 8,497,885 B2 * | 7/2013 | Ikeda et al. | ................... | 345/690 |
| 2001/0038075 A1 | 11/2001 | Morishita | | |
| 2002/0097622 A1 * | 7/2002 | Kawabata | .................... | 365/205 |
| 2004/0155175 A1 * | 8/2004 | McNulty | .................... | 250/208.1 |
| 2005/0156901 A1 * | 7/2005 | Ma et al. | ....................... | 345/173 |
| 2006/0279478 A1 * | 12/2006 | Ikegami | ......................... | 345/30 |
| 2009/0289966 A1 * | 11/2009 | Ikeda et al. | .................... | 345/690 |
| 2010/0188491 A1 | 7/2010 | Shizukuishi | | |
| 2011/0050874 A1 | 3/2011 | Reshef et al. | | |
| 2011/0102403 A1 * | 5/2011 | Kim | ............................. | 345/211 |

* cited by examiner

*Primary Examiner* — Jefferey Harold
*Assistant Examiner* — Mustafizur Rahman
(74) *Attorney, Agent, or Firm* — Allen, Dyer, Doppelt, Milbrath & Gilchrist, P.A.

(57) ABSTRACT

A method is for monitoring the electrical integrity of lines of photosites of an imaging device with matrix array of photosites. The control lines of photosites may include for each line of photosites an emission of elementary electrical control signals for the photosites of the line. The method may include diagnosis of the elementary electrical control signals emitted.

20 Claims, 3 Drawing Sheets

METHOD OF REAL-TIME CHECKING OF A MATRIX IMAGING DEVICE, AND ASSOCIATED DEVICE

FIELD OF THE INVENTION

The present disclosure relates to imaging devices with a matrix array of photosites, and more particularly, to the checking of the electrical integrity of the control system for the lines.

BACKGROUND OF THE INVENTION

An imaging device, or sensor, is a photosensitive electronic component serving to convert electromagnetic radiation into an analog electrical signal. This signal is thereafter amplified and then digitized by an analog-digital converter and finally processed to obtain a digital image. The imaging device exploits the photoelectric effect, which allows the incident photons to tear electrons from each active element. An imaging device generally comprises photosites arranged as a matrix, each photosite corresponding to a pixel of an image.

A photosite comprises at least one photosensitive zone, for example, a photodiode, and one zone for reading the charge accumulated in the photodiode. The photons captured by the photodiode are converted into electron/hole pairs stored in the photosite before being read by an electronic system.

Generally, this electronic system, which controls the photodiode, comprises, especially when the photodiode is a fully depleted photodiode, a transfer transistor permitting the transfer of charge from the photodiode to a charge reading zone. This reading zone forms a measurement node (or "sensing node"), which is connected to typical reading electronics comprising a reading transistor.

A photodiode operates according to a cycle comprising at least one integration step, one measurement step, and one re-initialization step. The integration step includes the photogeneration of charge and its accumulation during exposure of the photodiode to light. The measurement step includes the generation of a signal dependent on the quantity of photogenerated charge accumulated in the photodiode. The re-initialization step includes the elimination of this charge.

Imaging devices are generally used for digital cameras intended for the general public, but they can also be used in security or monitoring devices, especially in onboard security devices embedded aboard motor vehicles. Imaging devices make it possible to detect, for example, obstacles, etc. Such security devices must be able to operate continuously in an optimal manner, and consequently, continuously check their various elements.

SUMMARY OF THE INVENTION

To monitor the operation of an imaging device, it may be helpful to check for proper operation of the column-wise reading of the pixels.

According to one embodiment, an imaging device may include a matrix array of photosites integrating means or a component for real-time checking of the electrical integrity of the photosites line control system. The real-time checking component may detect deterioration, if any, in the electrical control circuit while the imaging device continues to operate normally. Checking may be carried out in a functional manner without disturbance to the captured image resulting, for example, from an analysis of the captured image.

According to one aspect, a method may be for monitoring the electrical integrity of the control of lines of photosites of an imaging device with matrix array of photosites. The control of lines of photosites may comprise for each line of photosites an emission of elementary electrical control signals for the photosites of the line. The monitoring method may comprise a diagnosis of the elementary electrical control signals emitted.

Additionally, the method may comprise an emission of a command signal, and for each line of photosites, a decoding of the command signal into elementary electrical control signals for the photosites of the line. The diagnosis may comprise a reception of the command signal, and for each line of photosites, a decoding of the command signal into elementary electrical reference signals corresponding to the elementary electrical control signals, a reception of the elementary electrical control signals emitted, and a comparison of the elementary electrical control signals emitted with the elementary electrical reference signals.

A photosite may comprise a charge transfer transistor, a reading transistor, and a re-initialization transistor. The decoding of the command signal may comprise for each line of photosites a formulation on the basis of the command signal of a global control signal, and a formulation on the basis of the global signal of three elementary control signals respectively intended to control in a sequential manner the charge transfer transistor, the reading transistor, and the re-initialization transistor, and the comparison of the elementary electrical control signals with the elementary electrical reference signals being a sequential comparison. Advantageously, the monitoring method can comprise storage of the signals arising from the comparisons.

According to another aspect, an imaging device with matrix array of photosites may comprise control means or a controller for lines of photosites of the array which are able to emit for each line of photosites elementary electrical control signals for the photosites of the line. The imaging device may comprise monitoring means or a monitor able to diagnose the elementary electrical control signals emitted so as to check the electrical integrity of the controller for lines of photosites.

In some embodiments, the controller may comprise means of emission or an emitter of a command signal, and a decoder able to decode for each line of photosites the command signal into elementary electrical control signals. The monitor may comprise an additional decoder to decode for each line of photosites the command signal emitted into elementary electrical reference signals corresponding to the elementary electrical control signals, and comparison means or a comparator able to compare the elementary electrical control signals emitted with the elementary electrical reference signals.

The controller may be coupled to a first end of the lines of photosites, and the monitor may be coupled to a second end of the lines of photosites. A photosite may comprise a charge transfer transistor, a reading transistor, and a re-initialization transistor. The decoder may formulate, for each line of photosites, a global control signal on the basis of the command signal. The controller may comprise for each line of photosites a control module able to formulate on the basis of the corresponding global signal three elementary control signals respectively intended to control in a sequential manner the charge transfer transistor, the reading transistor, and the re-initialization transistor. The additional decoder may formulate for each line of photosites a global reference signal on the basis of the command signal. The monitor may comprise for each line of photosites a reference module able to formulate three elementary reference signals respectively intended to be delivered in a sequential manner to the corresponding comparator. Advantageously, the imaging device may comprise storage means or a storage able to store the signals delivered by the comparator.

BRIEF DESCRIPTION OF THE DRAWINGS

Other advantages and characteristics of the invention will be apparent on examining the detailed description of wholly non-limiting embodiments and the appended drawings in which.

DETAILED DESCRIPTION OF THE PREFERRED EMBODIMENTS

Figure 1:
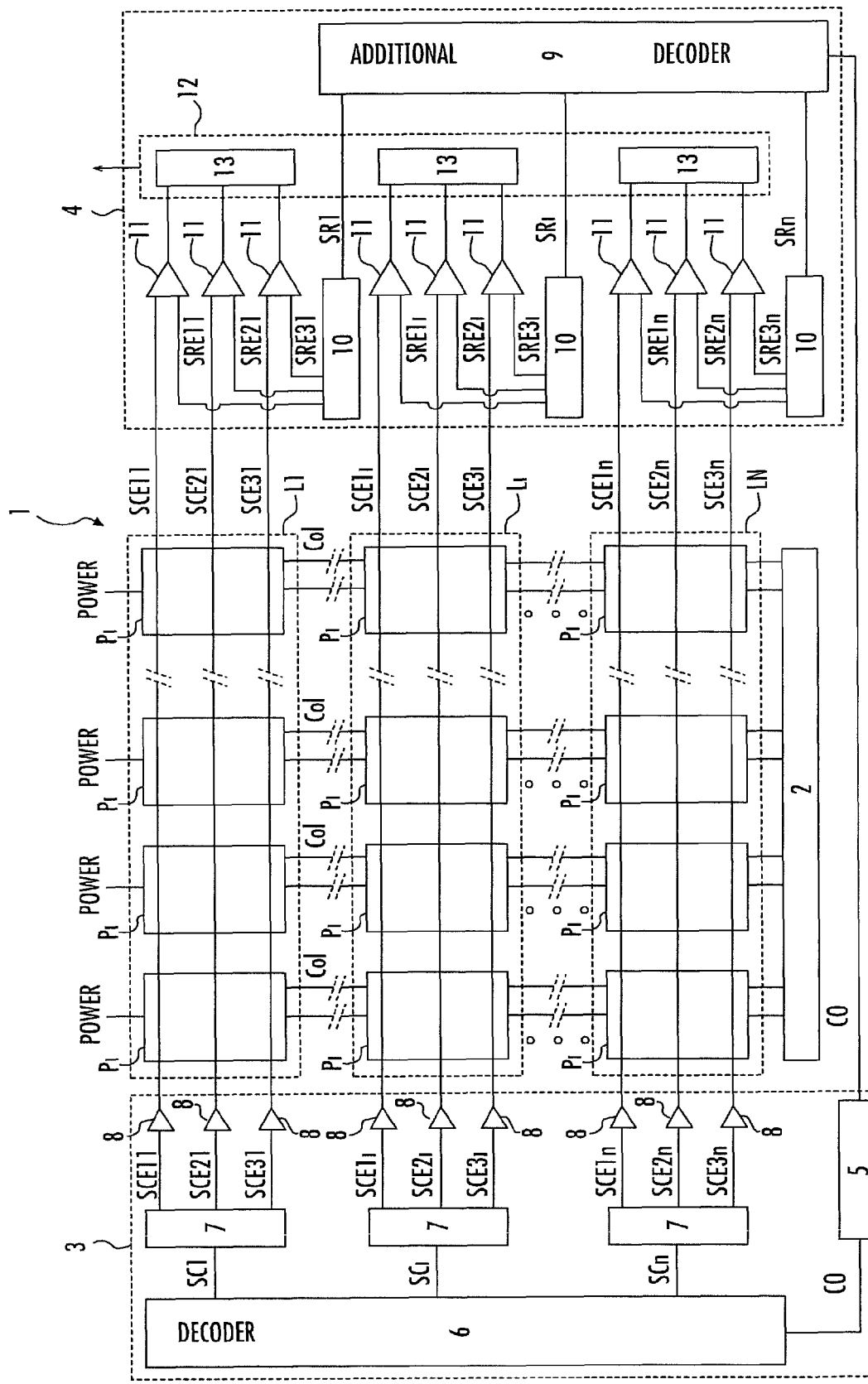
FIG. 1 is a schematic diagram of an imaging device, according to an embodiment of the present disclosure.

In FIG. 1, an imaging device according to one embodiment of the invention is shown. The imaging device comprises an array 1 of photosites Pi arranged according to lines L1 to Ln and columns of photosites Pi, the columns being coupled to means or a module 2 for reading the photosites Pi. The imaging device also comprises means of control 3 or a controller of lines L1 to Ln of photosites Pi capable of emitting elementary electrical control signals SCE1$i$ to SCE1$n$ for each line of photosites Pi, and monitoring means or a monitor 4 configured to carry out a diagnosis of the elementary electrical control signals SCE1$i$ to SCE1$n$ emitted.

The controller 3 comprises means 5 for emitting or an emitter for command signals CO capable of generating a signal CO comprising, for each line L1 to Ln, sequential control commands for the photosites Pi of a line. The controller 3 furthermore comprises a decoder 6, which receives as input the command signals CO emitted by the emitter 5. On receipt of a command signal CO, the decoder 6 processes the command signal CO so as to decompose it into a plurality of global control signals SC1 to SCn respectively for the lines L1 to Ln. The decoder 6 thus delivers as output a global control signal SC1 to SCn for each line L1 to Ln of photosites Pi. The decoder 6 therefore delivers as many global control signals SC1 to SCn as there are lines L1 to Ln of photosites Pi in the array 1. A global control signal SCi is a sequential signal comprising information making it possible to sequentially control the various transistors of the photosites Pi of a line Li.

Each global control signal SCi is delivered to a control module 7 for the photosites Pi of a line Li. The control modules 7, included in the controller 3, process the global control signal SCi received as input so as to deliver as output, via operational amplifiers 8, three distinct elementary electrical control signals SCE1$i$, SCE2$i$ and SCE3$i$ controlling transistors of the photosites Pi. The decoder 6, the control modules 7, and the operational amplifiers 8 are typical components.

Figure 2:
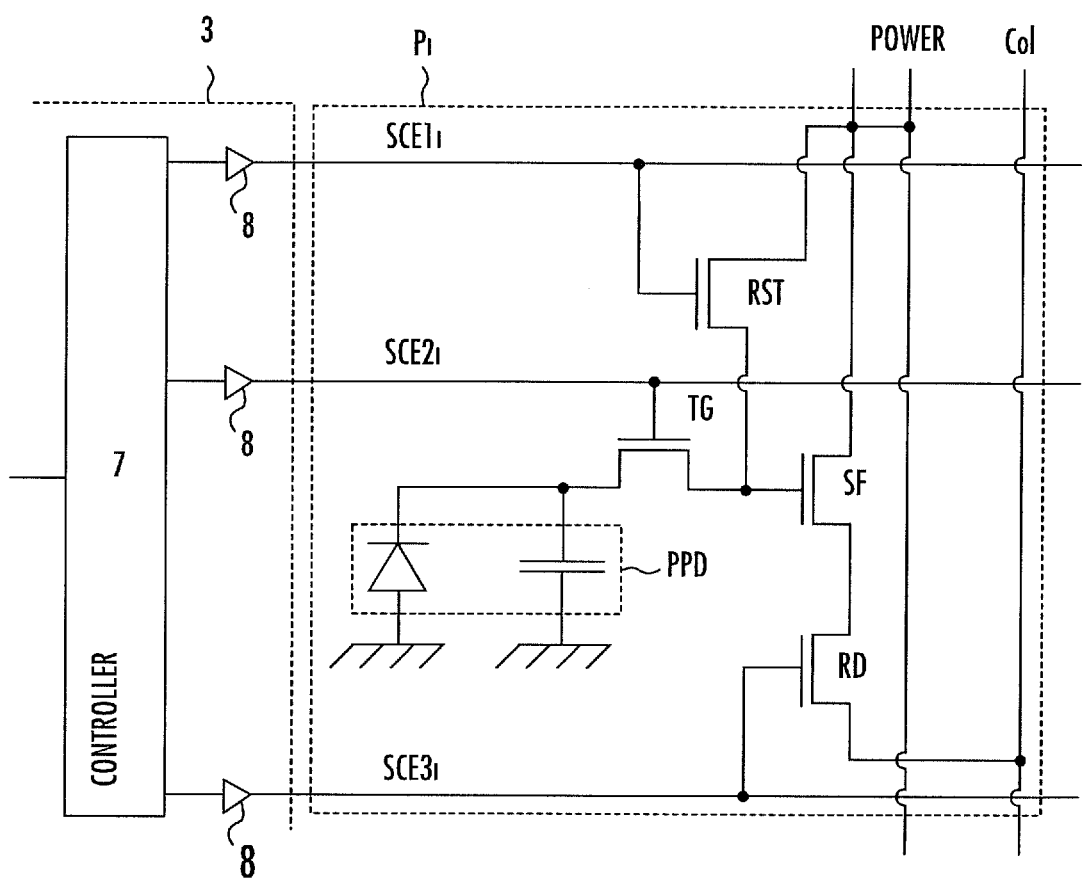
FIG. 2 illustrates a photosite of the imaging device of FIG. 1.

FIG. 2 illustrates in a schematic manner a photosite Pi of the array 1 of the imaging device of FIG. 1. As is illustrated in FIG. 2, a photosite Pi comprises a photodiode PPD making it possible to transform the photons incident on the photosite Pi into electrical charge. The photodiode PPD is coupled to a charge transfer transistor TG whose gate is controlled by a first elementary electrical control signal SCE2$i$ emitted by the control module 7. The transfer transistor TG is coupled moreover to the gate of a follower transistor SF coupled on the one hand to a power source (Power) and to a reading transistor RD. The transfer transistor TG makes it possible, when it is activated, to transfer the charge collected in the photodiode PPD to the follower transistor SF, which amplifies the signal received on its gate before delivering it to the reading transistor RD.

The gate of the reading transistor RD is controlled by a second elementary electrical control signal SCE3$i$ emitted by the control module 7. The control terminal of the reading transistor RD makes it possible to transfer the signal received from the follower transistor SF to the column line Col coupled to the reading means or a reader 2.

Furthermore, the photosite Pi also comprises a re-initialization transistor RST coupled on the one hand to the power source (Power), on the other hand to the gate of the follower transistor SF, and whose gate is controlled by a third elementary electrical control signal SCE1$i$ emitted by the control module 7. When it is activated, the re-initialization transistor RST makes it possible to reset to zero the signal on the follower transistor SF, on the reading transistor RD, and in the photodiode PPD according to the transistors configured as enabled.

To operate the photosite Pi correctly, it is therefore necessary that the first, second and third elementary electrical control signals SCE1$i$, SCE2$i$ and SCE3$i$ be emitted in a sequential manner, i.e. at different instants, so as to control the reading of the charge accumulated in the photodiode PPD, or to reinitialize the photodiode PPD, for example.

As is illustrated in FIG. 1, the three elementary electrical control signals SCE1$i$, SCE2$i$ and SCE3$i$, of one and the same line Li of photosites Pi, control in the same manner all the photosites Pi of the line Li. The three elementary electrical control signals SCE1$i$, SCE2$i$ and SCE3$i$ for each line Li of photosites Pi are received as input for the monitor 4 so as to be checked and thus to determine whether the electrical integrity of the controller 3 is preserved.

The monitor 4 comprises a monitoring decoder 9, which may be structurally identical to the decoder 6. This monitoring decoder 9 receives as input the command signals CO emitted by the emitter 5. On receipt of a command signal CO, the monitoring decoder 9 processes the command signal CO so as to decompose it into a plurality of global reference signals SR1 to SRn. The monitoring decoder 9 then delivers as output a global reference signal SR1 to SRn, for each line L1 to Ln of photosites Pi. The monitoring decoder 9 therefore delivers as many global reference signals SR1 to SRn as there are lines L1 to Ln of photosites Pi in the array 1. A global reference signal SRi is a sequential signal corresponding to the global control signal SCi comprising sequential information relating to the control of the various transistors of the photosites Pi of a line Li.

The monitor 4 comprises a plurality of reference modules 10, which each receives a global reference signal SC1 to SCn. The reference modules 10 may be structurally identical to the control modules 7. Each reference module 10 processes the global reference signal SCi received as input so as to deliver, as output, three distinct elementary electrical reference signals SRE1$i$, SRE2$i$ and SRE3$i$ corresponding to the three elementary electrical control signals SCE1$i$, SCE2$i$ and SCE3$i$ for the transistors of the photosites Pi of a line Li.

The monitor 4 comprises comparison means or a comparator 11, which receives as input an elementary electrical control signal SCE1$i$ or SCE2$i$ or SCE3$i$ and a corresponding elementary electrical reference signal SRE1$i$ or SRE2$i$ or SRE3$i$. Each line Li of photosites Pi is thus associated with three comparators 11, first comparison means or a first comparator receiving the first elementary electrical control signal SCE1$I$ and the first elementary electrical reference signal SRE1I corresponding, for example, to the control of the line re-initialization transistors RST, second comparison means or a second comparator receiving the second elementary electrical control signal SCE2I and the second elementary electrical reference signal SRE2I corresponding, for example, to the control of the line transfer transistors TG, and third comparison means or a third comparator receiving the third elementary electrical control signal SCE3I and the third elementary electrical reference signal SRE3I corresponding, for example, to the control of the line reading transistors RD.

The comparison may be carried out by a subtraction of the signals received as input for the comparator 11. In this case, for example, if the output signal of the comparator 11 is not zero, to within an approximation, the electrical integrity of the line is compromised, and a defect exists in the controller 3 or on the electrical line coupling the photosites Pi of the line.

The comparator 11 is coupled at output to a storage block 12 comprising memories 13. These memories 13 make it possible to record the measurements carried out over time and to have these measurements available at any moment.

Figure 3:
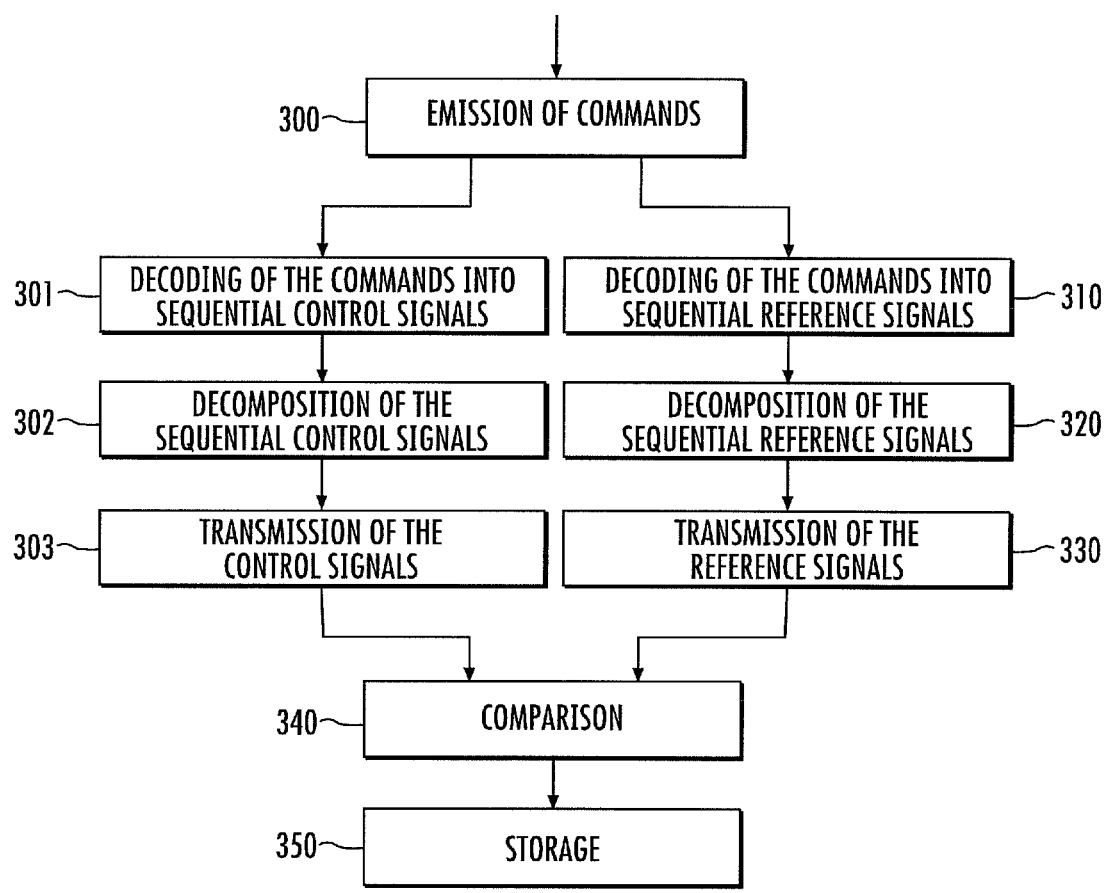
FIG. 3 is a flowchart of a monitoring method, according to an embodiment of the present disclosure.

In FIG. 3 is presented a flowchart of a monitoring method according to a mode of implementation of the invention. In a first step 300, a control command signal CO is emitted for a sequential control of the lines L1 to Ln of photosites Pi. In a second step 301, the command signal CO is decoded into a plurality of global control signals SC1 to SCn for lines L1 to Ln so as to have a global control signal SCi per line Li of photosites Pi.

In a third prior step 302, for each line Li of photosites Pi, the global control signal SCi received is decomposed into three elementary electrical control signals SCE1$i$, SCE2$i$ and SCE3$i$ able to respectively control the re-initialization transistor RST, the charge transfer transistor TG, and the reading transistor RD of the photosites Pi of the line Li. Finally, in a fourth step 303, the three elementary electrical control signals SCE1$i$, SCE2$i$ and SCE3$i$ for each line Li are transmitted in a sequential manner so as to control the photosites Pi.

In parallel with the second, third and fourth steps 301 to 303, the command signal CO is decoded in a step 310 into a plurality of global reference signals SR1 to SRn so as to obtain a global reference signal Sri per line Li of photosites Pi, and then, in a following step 320, for each line Li of photosites Pi, the global reference signal Sri is decomposed into three elementary electrical reference signals SRE1I, SRE2I and SRE3$i$ corresponding to the three elementary electrical control signals SCE1$i$, SCE2$i$ and SCE3$i$. In step 330, the three elementary electrical reference signals SRE1I, SRE2I and SRE3$i$ for each line Li are transmitted to the comparator 11.

In a following step 340, the elementary electrical control signals SCE1$i$, SCE2$i$ and SCE3$i$ are compared, for each line Li, with the corresponding elementary electrical reference signals SRE1I, SRE2I and SRE3$i$. In a following step 350, the signals arising from the comparison between the elementary electrical control signals SCE1$i$, SCE2$i$ and SCE3$i$ and the corresponding elementary electrical reference signals SRE1I, SRE2I and SRE3$i$ are stored.

Such an imaging device with matrix array of photosites integrating means or a component of real-time checking of the electrical integrity of the control system for the lines of photosites of the imaging device makes it possible to detect a deterioration, if any, in the electrical control circuit for the lines of photosites, while the imaging device continues to operate normally. Checking is carried out in a functional manner without analysis of the image, thus avoiding disturbance to the monitoring according to the image captured.

That which is claimed is:

1. A method of monitoring a plurality of control lines, each control line controlling a respective row of photosites of an imaging device, the method comprising:
   for each control line, decoding a command signal into a plurality of elementary control signals for a respective row of photosites of the control line; and
   diagnosing the plurality of elementary control signals, the diagnosing comprising comparing of the plurality of elementary control signals with a plurality of elementary reference signals.

2. The method according to claim 1 wherein diagnosing further comprises:
   receiving the command signal;
   for each control line, decoding the command signal into the plurality of elementary reference signals corresponding to the plurality of elementary control signals; and
   receiving the plurality of elementary control signals.

3. The method according to claim 2 wherein each photosite comprises a charge transfer transistor, a reading transistor, and a re-initialization transistor coupled to the charge transfer and reading transistors; wherein decoding the command signal comprises:
   for each control line of the row of photosites, generating a global control signal based upon the command signal;
   generating based upon the global control signal three elementary control signals from the plurality thereof respectively for controlling in a sequential manner the charge transfer transistor, the reading transistor, and the re-initialization transistor; and
   sequentially comparing the plurality of elementary control signals with the plurality of elementary reference signals.

4. A method of monitoring a plurality of control lines, each control line controlling a respective row of photosites of an imaging device, the method comprising:
   for each control line, decoding of a command signal into a plurality of elementary control signals for a respective row of photosites of the control line; and
   diagnosing the plurality of elementary control signals and storing a result thereof, the diagnosing comprising comparing of the plurality of elementary control signals with a plurality of elementary reference signals.

5. The method according to claim 4 wherein diagnosing comprises:
   receiving the command signal;
   for each control line, decoding the command signal into the plurality of elementary reference signals corresponding to the plurality of elementary control signals; and
   receiving the plurality of elementary control signals.

6. The method according to claim 5 wherein each photosite comprises a charge transfer transistor, a reading transistor, and a re-initialization transistor coupled to the charge transfer and reading transistors; wherein decoding the command signal comprises:
   for each control line of the row of photosites, generating a global control signal based upon the command signal;
   generating based upon the global control signal three elementary control signals from the plurality thereof respectively for controlling in a sequential manner the charge transfer transistor, the reading transistor, and the re-initialization transistor; and
   sequentially comparing the plurality of elementary control signals with the plurality of elementary reference signals.

7. An imaging device comprising:
- a matrix array of photosites comprising a plurality of rows of photosites;
- a plurality of control lines coupled respectively to said plurality of rows of photosites;
- a controller coupled to said plurality of control lines and configured to emit for each control line a plurality of elementary control signals for a respective row of photosites; and
- a monitor configured to diagnose the plurality of elementary control signals.

8. The imaging device according to claim 7 wherein said controller comprises a module configured to emit a command signal, a decoder configured to decode for each control line the command signal into the plurality of elementary control signals.

9. The imaging device according to claim 8 wherein said monitor comprises an additional decoder configured to decode for each control line the command signal into a plurality of elementary reference signals corresponding to the plurality of elementary control signals, and a comparator configured to compare the plurality of elementary control signals with the plurality of elementary reference signals.

10. The imaging device according to claim 7 wherein said controller is coupled to a first end of said plurality of control lines; and wherein said monitor is coupled to a second end of said plurality of control lines.

11. The imaging device according to claim 9 wherein each photosite comprises a charge transfer transistor, a reading transistor, and a re-initialization transistor coupled to said charge transfer and reading transistors; wherein said decoder is configured to generate for each control line a global control signal based upon the command signal.

12. The imaging device according to claim 9 wherein said controller comprises for each control line a control module configured to generate based upon the corresponding global control signal three elementary control signals from the plurality thereof respectively for controlling in a sequential manner said charge transfer transistor, said reading transistor, and said re-initialization transistor.

13. The imaging device according to claim 12 wherein said additional decoder is configured to generate for each control line a global reference signal based upon the command signal; and wherein said monitor comprises for each control line a reference module configured to generate three elementary reference signals respectively to be delivered in a sequential manner to a corresponding comparator.

14. The imaging device according to claim 9 further comprising a storage configured to store signals delivered by said comparator.

15. An imaging device comprising:
- a matrix array of photosites comprising rows and columns of photosites;
- a plurality of lines coupled respectively to said rows of photosites;
- a controller coupled to said plurality of lines and configured to generate for each line a plurality of elementary control signals for a respective row of photosites; and
- a monitor configured to
  - generate a plurality of elementary reference signals based upon a command signal from said controller, and
  - compare the plurality of elementary reference signals and the plurality of elementary control signals.

16. The imaging device according to claim 15 wherein said controller comprises a decoder configured to decode for each line the command signal into the plurality of elementary control signals.

17. The imaging device according to claim 15 wherein said monitor comprises an additional decoder configured to decode for each line the command signal into the plurality of elementary reference signals corresponding to the plurality of elementary control signals.

18. The imaging device according to claim 15 wherein said controller is coupled to a first end of said plurality of lines; and wherein said monitor is coupled to a second end of said plurality of lines.

19. The imaging device according to claim 16 wherein each photosite comprises a charge transfer transistor, a reading transistor, and a re-initialization transistor coupled to said charge transfer and reading transistors; wherein said decoder is configured to generate for each line a global control signal based upon the command signal.

20. The imaging device according to claim 19 wherein said controller comprises for each line a control module configured to generate based upon the corresponding global control signal three elementary control signals from the plurality thereof respectively for controlling in a sequential manner said charge transfer transistor, said reading transistor, and said re-initialization transistor.

* * * * *